Figure 4:
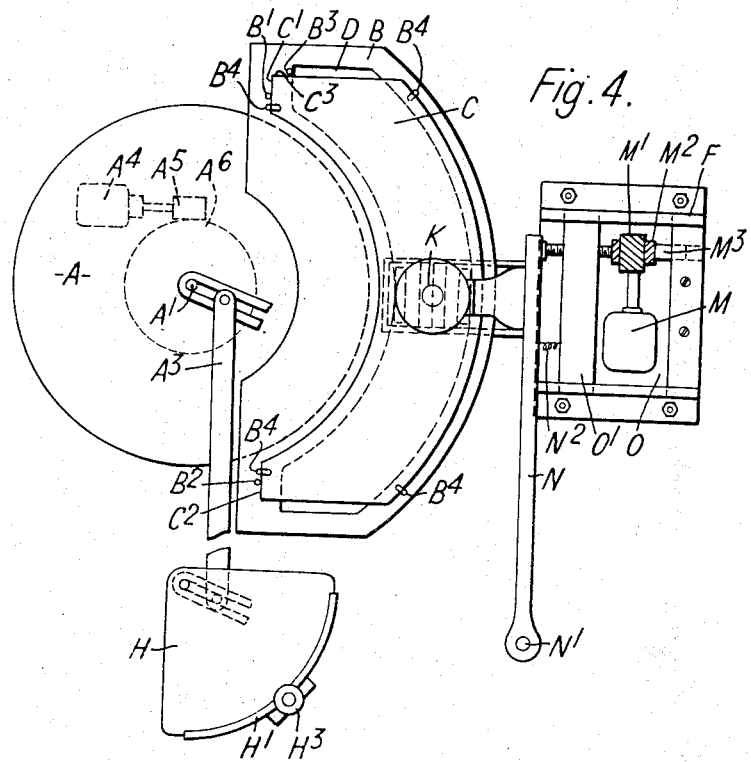

Jan. 8, 1963  G. O. RAWSTRON  3,072,014
PHOTOGRAPHIC APPARATUS FOR PRODUCING CURVED LINES
Filed Dec. 7, 1959  4 Sheets-Sheet 1
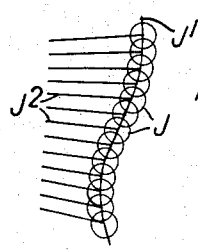
Fig. 1.
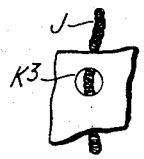
Fig. 6.
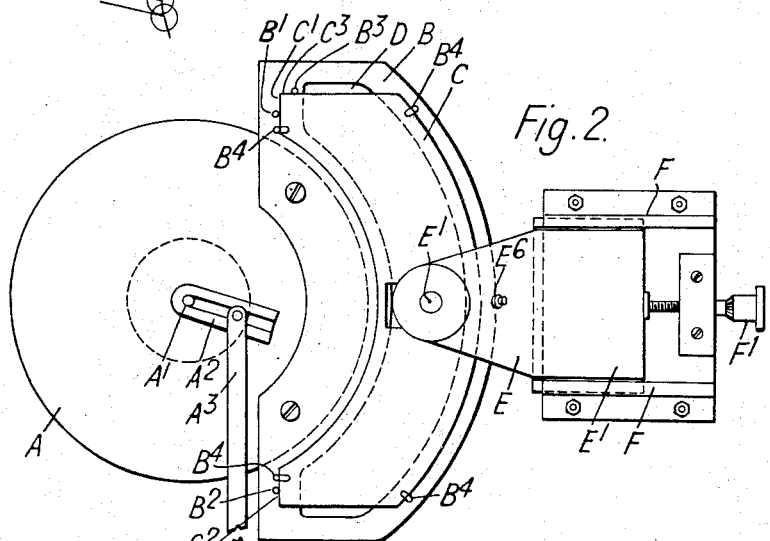
Fig. 2.
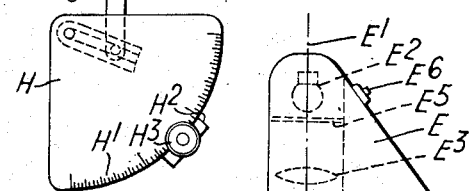
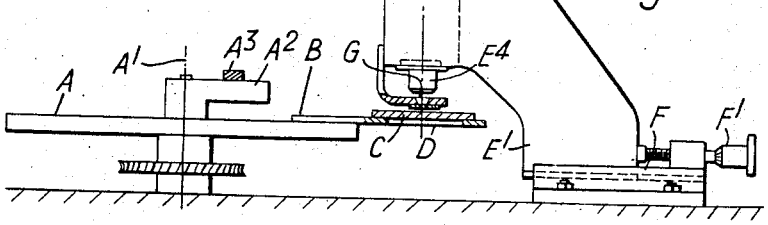
Fig. 3.
Inventor
G. O. Rawstron
By
Holcomb, Wetherill & Brisebois
Attorneys Inventor
G. O. Rawstron Jan. 8, 1963   G. O. RAWSTRON   3,072,014
PHOTOGRAPHIC APPARATUS FOR PRODUCING CURVED LINES
Filed Dec. 7, 1959   4 Sheets-Sheet 3
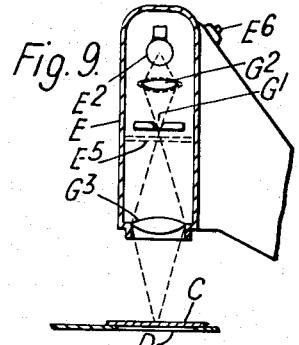
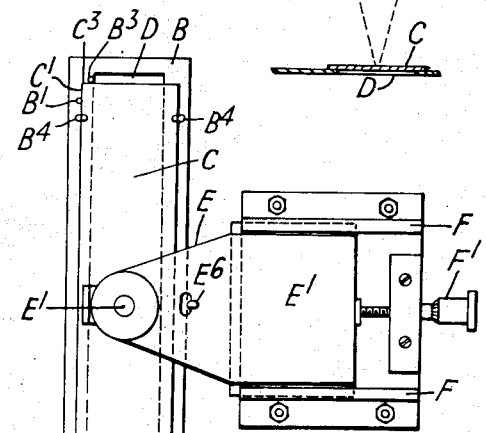
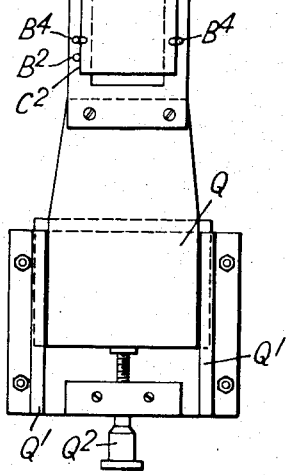
Inventor
G. O. Rawstron
By
Attorneys United States Patent Office 3,072,014
Patented Jan. 8, 1963

3,072,014
PHOTOGRAPHIC APPARATUS FOR PRODUCING CURVED LINES
George Ormerod Rawstron, Leicester, England, assignor to Rank Precision Industries Limited, trading as Taylor, Taylor & Hobson, Leicester, England, a company of Great Britain
Filed Dec. 7, 1959, Ser. No. 857,817
Claims priority, application Great Britain Dec. 9, 1958
8 Claims. (Cl. 88—24)

This invention relates to an apparatus for manufacturing an optical cam device of the kind in which the desired cam shape is represented on a sheet by a curved line of small patches contrasting in respect of light-transmitting properties with the background constituted by the adjacent portions of the sheet. Such a cam device can be utilised in conjunction with a beam of light incident on photoelectric means for highly accurate cam control of mechanical movement, and the present invention has for its object to provide a simple and efficient apparatus for generating such a cam device with a high degree of accuracy in accordance with coordinate measurements.

In the apparatus for generating such a cam device according to the present invention, relative movements between a sensitive photographic element and a small aperture are effected in small steps in accordance with the coordinate measurements, in each stepped position light from a source is concentrated with the aid of the aperture on a small area of the sensitive element whereby a small patch of shape corresponding to that of the aperture is photographically recorded on the element, and the element is developed to produce a negative on which a line of small dark or opaque patches is recorded on a translucent background, such line of patches constituting an optical representation of the cam shape defined by the coordinate measurements.

Preferably, each of the stepped movements is the resultant of two component relative movements in accordance with a system of two coordinates, the component movements in one coordinate being effected in equal small steps, whilst those in the second coordinate are constituted by accurately measured movements appropriate to such equal stepped movements to suit the desired cam shape. Conveniently, a polar system of coordinates is used, the equal stepped component movements being effected in the angular coordinate, whilst the measured component movements are effected in the radial coordinate.

Whilst the small aperture may be shaped to produce patches in the form of short relatively thin straight lines, it will usually be preferable for the aperture to be circular in shape and of a size bearing such relation to the magnitude of the equal stepped component movements in the first coordinate that the round dots constituting the patches overlap one another to form a continuous curved line of the negative.

Again, it is usually preferable to use the negative as the optical cam device, but if desired the negative may be printed to produce a positive, in which a line of translucent patches on a dark or opaque background constitutes the optical representation of the desired cam shape for use as the optical cam device.

According to the invention, apparatus for generating an optical cam device of the kind described in accordance wtih coordinate measurements, comprises a support for a sensitive photographic element, a photographic unit including a small aperture and means whereby light from a source can be concentrated at will with the aid of the aperture on to a small area of the sensitive element, and means for effecting small stepped relative movements between the element support and the photographic unit in accordance with the coordinate measurements, so that in each stepped position the photographic unit can be operated to expose the small area of the sensitive element to the light, whereby the element when developed will produce a negative bearing a line of small dark or opaque patches of shape corresponding to that of the aperture on a translucent background constituting an optical representation of the cam shape defined by the coordinate measurements.

Thus, when each of the stepped relative movements is the resultant of two component movements in accordance with a system of two coordinates (preferably, polar coordintaes), the component movements in one coordinate (the angular coordinate) are preferably imparted in equal steps to one of the two members constituted respectively by the element support and the photographic unit, whilst those in the second coordinate (the radial coordinate) are constituted by accurately measured movements appropriate to such equal stepped movements to suit the desired cam shape and are imparted to the same member or preferably to the other member under micrometer control. In one convenient practical arrangement, the element support consists of or is carried by a disc rotatably mounted about the origin of coordinates, and the photographic unit is mounted to slide along a fixed radial guide under the control of the micrometer. For the control of the rotational component movement, it is convenient to use an arcuate scale having equally spaced graduations cooperating with an index mark in conjunction with a microscope for viewing such scale.

The photographic unit may be arranged in various ways. Thus, the aperture may be mounted closely adjacent to the sensitive photographic element so as to expose to the light only that area of the element immediately adjacent to the aperture. Preferably, however, the photographic unit comprises a closed casing, a small aperture in the casing, a source of light in the casing, an optical condensing system for concentrating light from the source on to the aperture, an optical objective for focusing the light from the aperture on to the sensitive photographic element, and a movable shutter normally shutting off the light from the sensitive element but operable at will to permit the light to pass to the element.

In practice, it is often convenient to utilise the element support also for carrying the negative after development in the subsequent use of the cam device for movement control, and for this purpose such support may be provided with three stops, with which three ground portions of the edge of the element cooperate, whereby the element after removal from the support for developing can be accurately re-positioned thereon when developed.

Figure 5:
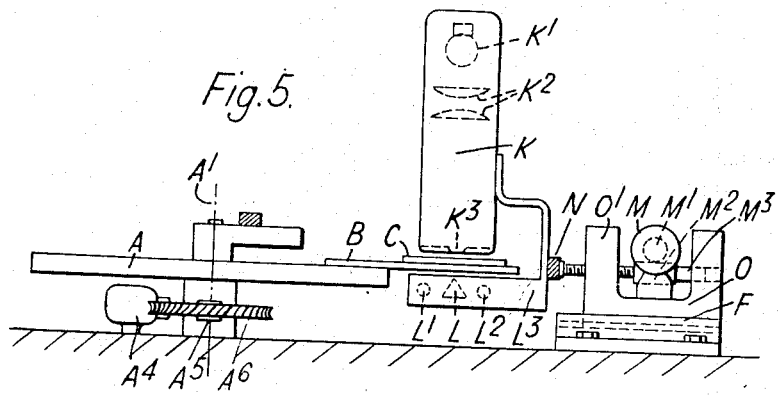
Figure 10:
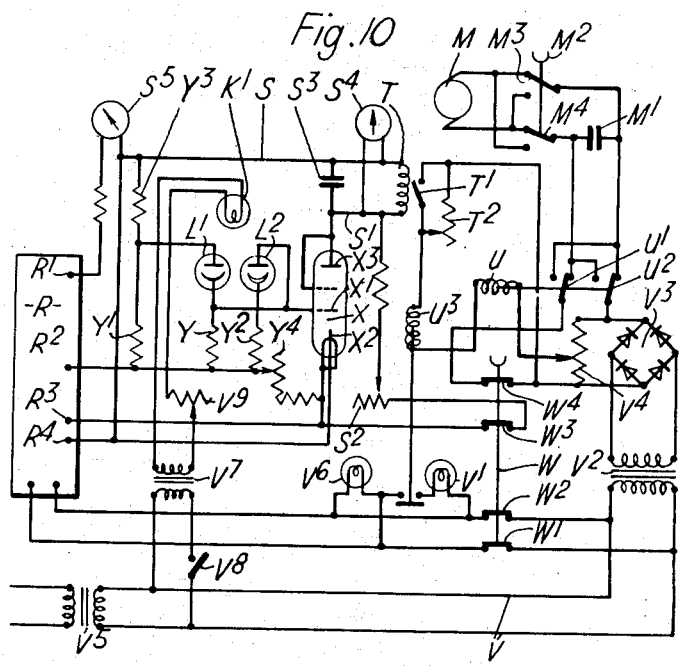

The invention may be carried into practice in various ways, but a preferred practical arrangement according thereto for generating an optical cam device is illustrated in the accompanying drawnigs. In the drawings, FIGURE 1 illustrates diagrammatically the preferred form of optical cam device, FIGURE 2 is a somewhat diagrammatic plan view of the preferred arrangement according to the present invention for generating such optical cam device, FIGURE 3 is a front view (partly in section) of the arrangement of FIGURE 2, FIGURES 4 and 5 are similar plan and front views showing the arrangement of FIGURES 2 and 3 as modified for practical use of the cam device for controlling mechanical movements, FIGURE 6 illustrates a detail of the arrangement of FIGURES 4 and 5, FIGURE 7 illustrates on an enlarged scale an alternative form of optical cam device, FIGURE 8 is a plan view of a modification of the arrangement of FIGURES 2 and 3, FIGURE 9 illustrates a preferred modification of the photographic unit included in the arrangement of FIGURES 2 and 3, and FIGURE 10 is a diagram of the electrical circuits incorporated in the arrangement shown in FIGURES 4 and 5.

In the arrangement of FIGURES 2 and 3, a disc A rotatably mounted about a fixed vertical axis $A^1$ carries a projection B on one side constituting a support for a sensitive photographic plate C. This projection B is provided with a generally arcuate slot D of length and width adequate to cover the ranges of the angular and radial movements required for the desired cam shape. The sensitive photographic plate C is of a size sufficient to fit over this slot. In order to ensure accurate positioning of the photographic plate C on the support B, the plate has two portions $C^1C^2$ of one of its side edges and a portion $C^3$ of one of its end edges ground to form lands, which engage respectively with three locating pins $B^1B^2$ and $B^3$ on the support B, and the support is also provided with clamps $B^4$ which can be tightened to hold the plate C firmly in position when it has been properly pressed into position against the locating pins.

A photographic unit is housed in a closed hollow casing E constituted by a bracket-like arm extending from a base $E^1$ which can slide in accurate straight guides F, which are bolted in position to ensure that the vertical optical axis $E^1$ of the unit moves in a radial direction with respect to the axis $A^1$ of the disc A carrying the support B for the photographic plate, when the base of the casing slides along the guides. This sliding movement along the guides F is effected by a micrometer head $F^1$ in accordance with calculated measurements defining the cam shape, as will be described in detail later.

The casing E of the unit carries a small circular aperture G accurately aligned on the optical axis $E^1$ of the unit and lying just above the surface of the photographic plate C. Vertically above the aperture G the casing E houses a source of light $E^2$ in the form of an electric lamp together with a condensing lens $E^3$ and an objective $E^4$ for concentrating a beam of light from the source on the part of the photographic plate C exposed through the aperture G. A shutter $E^5$ is provided between the source $E^2$ and the aperture G for shutting off the light from the aperture, this shutter being opened by suitable mechanism (not shown) actuated by a press-button $E^6$ on the casing E, when required, to allow the light to pass to the aperture G. The casing E is so arranged as to ensure that no stray light from the source $E^2$ passes through the aperture G when the shutter $E^5$ is in its normal closed position.

The disc A carrying the support B for the photographic plate C can be rotated about its axis $A^1$, for example through a crank $A^2$ and connecting rod $A^3$, by operating a rotatable sector H bearing an accurately graduated scale $H^1$ with equally spaced graduations cooperating with an index mark, on a fixed bracket $H^2$ a microscope $H^3$ being provided for viewing the scale to ensure accuracy in the rotational movements of the disc A about its pivot axis $A^1$. Means (not shown) are provided for adequately screening the photographic plate C from the light used for viewing this scale $H^1$.

When an optical cam device is to be generated, a sensitive photographic plate C is placed on the support B with its lands $C^1C^2C^3$ in engagement with the locating pins $B^1B^2B^3$ and is clamped to the support B in such position. The scale $H^1$, viewed through the microscope $H^3$, is brought to its zero position at one end of the range, thus causing one end of the arcuate slot D beneath the photographic plate C to be brought adjacent to the aperture G of the photographic unit. The micrometer $F^1$ is then adjusted, as may be required, to the appropriate measurement for such zero position, thereby moving the photographic unit along its guides F. When the parts have been properly adjusted into these positions, the press-button $E^6$ is operated to open the shutter $E^5$, and thereby to expose a small round patch on the plate C to the beam of light passing through the aperture G. Release of the press-button $E^6$ after a suitable exposure time closes the shutter and cuts off the light from the aperture G.

The scale $H^1$ is then adjusted to the next graduation mark, thus causing the photographic plate C to swing about the axis $A^1$ of the disc A through a small angle, and the micrometer $F^1$ is adjusted in accordance with the appropriate measurement for such graduation. The press-button $E^6$ is then again operated and released to expose a new round patch on the plate C.

The scale $H^1$ is then adjusted to the next graduation mark and the micrometer $F^1$ appropriately operated, with further operation and release of the press-button $E^6$ to expose a third round patch on the plate C. This cycle of operations is repeated for the various graduations on the scale $H^1$, thus exposing a line of round patches on the plate C one after another, this line being curved to the desired cam shape in accordance with the calculated measurements applied to the micrometer in each stepped position.

When all the necessary dots have been exposed, the plate C is removed from its support B and developed to produce a negative having a curved line of dark or opaque round dots on a translucent background. This negative is preferably itself used to constitute the optical cam device, but if preferred a further sensitive plate of exactly the same size and shape as the first may be printed from the negative and developed to produce a positive, having a line of translucent round dots on a dark or opaque background, for use as the optical cam device.

FIGURE 1 illustrates diagrammatically on an enlarged scale a typical portion of such optical cam device, the small circles J indicating the peripheries of the individual dots (whether opaque or translucent). The actual cam shape is constituted by the line of centres $J^1$ of such dots. The magnitude of each stepped angular movement of the plate C is preferably chosen to be materially smaller than the size of each round dot J exposed on the plate, so that these dots overlap one another and form a continuous curved line. The lines $J^2$ from the centres of the dots J indicate the radial lines to the axis $A^1$ of the disc A, along which the positions of the dots are determined in accordance with the calculated measurements.

Such a cam device, whether negative or positive, photographically produced in accordance with the present invention, may be used for the control of mechanical movements. Such, movement control apparatus may comprise the combination with the optical cam device, of a source of light, means for directing light from the source on to a small aperture adjacent to the line of dots of the cam device, photoelectric means responsive to lateral displacement of the aperture relative to the line of dots, electrical means responsive to the output of the photoelectric means for causing relative movement between the cam device and the small aperture to correct for such lateral displacement, and means for effecting the desired controlled movement in accordance with such correcting movement.

It is especially convenient in such apparatus as shown in FIGURES 4 and 5, to utilise for holding the optical cam device the same photographic plate support B which was used for the photographic generation of the cam device. For this purpose, as has been mentioned, the photographic plate C is provided with ground lands $C^1C^2C^3$ on its edges for engagement with locating pins $B^1B^2B^3$ on the support B to ensure that the plate after development can be replaced with a high degree of accuracy in the same position on the support. The photographic unit is then removed and replaced in the same mounting by another unit incorporating the main parts of the movement control apparatus, whereby the correcting movement takes place in exactly the same direction as the micrometer-controlled movement of the photographic unit. This ensures that, when the disc A carrying the cam device is rotated, the correcting movement will take place strictly in accordance with the measurements defining the operation of the micrometer $F^1$ during photographing.

This movement control unit comprises a casing K, housing a source of light $K^1$ and a lens $K^2$ for concentrating light from the source through a small aperture $K^3$ in the base of the casing on to the optical cam device on the plate C. This light passes through the translucent portions of the plate to a beam-splitter L which divides the beam into two parts respectively incident on two photoelectric cells $L^1L^2$, whose electrical outputs are differentially applied to an electric circuit controlling the operation of a reversible electric motor M. The casing K and also a casing $L^3$ containing the beam-splitter and photoelectric cells are carried on a long arm N pivoted at $N^1$, the length of the arm and the position of the pivot being such that the movement of the unit $KL^3$ will take place substantially radially with respect to the axis $A^1$. The reversible motor M acts through worm gearing $M^1M^2$ to drive a shaft $M^3$ in screwthreaded engagement in a bracket $O^1$ on a base O, which supports the motor M and is clamped in position in the fixed guides F used during photographic generation of the cam device. The end of the screw-threaded shaft $M^3$ abuts against the long arm N, which is also coupled to the bracket $O^1$ by means of a spring $N^2$.

The direction of rotation of the motor M is determined in accordance with the relative outputs of the two photoelectric cells $L^1L^2$, whereby a correcting movement is applied by the motor to the movement control unit $KL^3$ so as to cause such unit to make small oscillations from one side to the other of the correct relative position determined by the optical cam device.

When the photographic negative is used as the cam device, the small aperture $K^3$ of the movement control apparatus is (as indicated in FIGURE 6) larger than that used during photographing so that the small area of the negative exposed through the aperture $K^3$ includes not only part of the line of dots J but also a small translucent area on each side thereof. Thus, the dark line of dots divides the beam of light passing through the small aperture $K^3$ into two parts which are deflected by beam-splitting device L respectively on to the two photocells $L^1$ and $L^2$. If the photographic positive is used as the cam device, an aperture of the same or of larger size may be used, but in this case in conjunction with a graticule, which is fixed relatively to the small aperture and bears an opaque straight line marking which divides the light passing through the aperture and through the dots into two parts which are deflected by the beam-splitting device respectively on to the two photocells. Such graticule may conveniently be mounted in the top wall of the casing $L^3$ with its opaque straight line marking immediately above the edge of the beam-splitter L.

The electrical circuit controlled by the photocells $L^1L^2$ and controlling the reversible electric motor M may be arranged in a variety of ways, but in one convenient arrangement, the circuit includes an electronic valve F of triode or tetrode type, the potential of the grid $X^1$ of which is controlled by a circuit resembling a bridge circuit energised from the high tension supply of the valve. The two photocells $L^1$ and $L^2$ are connected in two of the arms of such bridge circuit, whilst the other two arms contain resistances $Y^1$ and $Y^2$ and a further resistance Y is connected across the diagonal of the bridge connecting the junction point of the two photocell arms and the junction point of the two resistance arms. The junction point of the two photocell arms is connected to the grid $X^1$ of the valve X, whilst the high tension supply $R^1R^2$ is connected through an auxiliary resistance $Y^3$ across one of the resistance arms of the bridge, such supply also being connected between the cathode $X^2$ of the valve and the positive output terminal S of the valve circuit, with the negative output terminal $S^1$ connected to the anode $X^3$ of the valve. A variable resistance $Y^4$ is provided in the connection from the high tension supply to the cathode $X^2$ of the valve for fine adjustment of the balance of the bridge.

The arrangement is such that, when the photocell outputs are balanced, sufficient anode current flows to close a sensitive relay T in the anode circuit. A shunt circuit is connected across such relay T containing an auxiliary bias supply (taken from the low tension supply $R^3R^4$ for the valve) and a variable resistance $S^2$, for bringing the relay T into a critical operating condition by passing a current in opposition to the anode current of the valve. A capacitor $S^3$ is shunted across the relay T to prevent vibration of the relay due to residual A.C. ripple in the circuit. The contacts $T^1$ of this sensitive relay T, which open and close in response to variations in the anode current of the valve X, control the energisation and de-energisation from an auxiliary source of a contactor U controlling reversing contacts $U^1U^2$ in the energising circuit of the electric motor M, a damping resistance $T^2$ being provided across the sensitive relay contacts $T^1$ for spark-quenching purposes.

Two microammeters $S^4S^5$ are provided in the circuit, one $S^4$ across the output terminals $S^1S^2$ of the valve circuit and the other $S^5$ in series with the high tension supply $R^1R^2$, for assisting the operator to adjust the variable resistances to get accurate balance in the circuits and therefore highly critical operation. It is also convenient to provide a flashing lamp indicator $V^1$ operated by a further contactor $U^3$ in series with the motor-reversing contactor U. The high tension and low tension supplies for the valve and the bias supply in the shunt circuit across the sensitive relay T may conveniently be derived from a mains-operated eliminator R, whilst the energising currents for the motor M and for the two contactors $UU^3$ are derived from the mains V through a transformer $V^2$ and a bridge rectifier $V^3$ and a potential divider $V^4$. It is desirable to provide a voltage stabilising transformer $V^5$ in the mains supply. The various supply circuits are controlled by a main switch W having contacts $W^1W^2W^3W^4$, of which the contacts $W^1W^2$ control the supplies to the eliminator R and the flashing lamp indicator $V^1$, the contact $W^4$ controls the supply to the motor and to the two contactors $UU^3$ and the contact $W^3$ controls the shunt circuit across the sensitive relay T, a further lamp indicator $V^6$ being provided to indicate whether such main switch W is open or closed. A capacitor $M^1$ is provided across the motor M and it is convenient to provide a hand-operated reversing switch $M^2$ with contacts $M^3$ and $M^4$ to enable the motor M to be reversed by hand, if desired. The source of light $K^1$ is energised from the mains V through a transformer $V^7$ controlled by a switch $V^8$, a variable resistance $V^9$ being provided in series with the lamp $K^1$.

The operation of this arrangement is started by switching on a motor $A^4$ for driving the disc A carrying the cam device support B, for example through worm gearing $A^5A^6$, to traverse the cam device slowly past the optical unit K, and also switching on the main switch W, after initially making any necessary adjustment to ensure that one end of the line of dots J is properly centered in the aperture $K^3$ of the optical unit. The electrical circuit in response to the outputs of the two photocells $L^1L^2$ will cause the motor M to oscillate rapidly between its forward and reverse drives, thereby enabling the optical unit K to follow the curves of the line of dots J with a high degree of accuracy as the traversing proceeds. The movement of the optical unit K is utilised, through suitable transmission mechanism, to effect the desired mechanical movement to be controlled by the cam device.

It will be clear that the above-described arrangement is intended primarily for the generation of a cam device, in which the effective cam line, that is the line of centres of the dots, deviates by only relatively small amounts from a circle centred on the axis A¹, for it is necessary for satisfactory operation that such cam line should never be at so steep an angle (say, greater than 30 degrees) relative to the operative edge of the beam-splitter that the portion of the line of dots beneath the small aperture K³ does not completely cover the edge of the beam-splitter. In cases where the desired mechanical movement needs to be controlled by a cam device having greater deviations from the true circle, it is still practicable to use the arrangement above described, provided that the calculated measurements determining the shape of the optical cam device are scaled down by a reduction ratio sufficient to bring the deviations within the above-described practicable limits, and to compensate for such scaling down by incorporating a lever or other device having a magnification ratio corresponding to such reduction ratio, in the transmission mechanism for effecting the desired mechanical movement in accordance with the cam device.

It will be appreciated that the above-described method of photographically generating the cam device may be modified in various ways within the scope of the invention. Thus, for instance, although the use of round dots will usually be preferable, since notwithstanding the curvature of the line of dots it will ensure satisfactory continuity of such line when the dots overlap one another, the photographic aperture may, if desired, have a shape other than circular, for example rectangular so that the dark patches on the negative will be in the form of short but relatively thin straight lines P, as indicated in FIGURE 7.

Again, the equal stepped movements may, if desired, be controlled by a second micrometer, instead of by a movable scale observed through a microscope. Such modification is illustrated in FIGURE 8, which also serves to show a further variant employing rectangular coordinates instead of polar coordinates. In this case, the photographic plate C and the support B with its slot D are conveniently rectangular in shape instead of arcuate, but are otherwise arranged as in the arrangement of FIGURES 2 and 3, and the support B is carried by a base Q sliding in fixed guides Q¹ at right angles to the guides F carrying the photographic unit. The equal stepped movements thus take place along the guides Q¹, instead of around a pivot axis, and may be controlled (as in FIGURES 2 and 3) by a scale observed through a microscope or (as actually shown) by a second micrometer Q². The operation of this arrangement will be clear without further description.

Various inversions of the polar-coordinate or rectangular-coordinate movements may be used, if desired, so that for example the equal stepped movements are applied to the photographic unit and the movements in accordance with calculated measurements are applied to the photographic plate. Or again, the two movements may be superimposed and applied to one of the two members constituted by the photographic unit and the plate, the other member being held stationary.

In the arrangement shown in FIGURES 2 and 3, the positioning of the aperture G closely adjacent to the photographic plate C is relied upon to define the shape of the dots recorded on the plate, but in practice it is found that better definition of the dot image can be obtained by disposing the aperture within the casing E and using an objective to focus such aperture accurately on the photographic plate. Such a modification is shown in FIGURE 9. In this modification the aperture is shown at G¹ and light from the source E² is concentrated on the aperture by a condensing lens G², the aperture G¹ being focussed on the photographic plate C by means of an objective G³. The shutter E⁵ in this modification is located just below the aperture G¹.

What I claim as my invention and desire to secure by Letters Patent is:

1. Apparatus for photographically generating an optical cam device in the form of a curved line of small patches wherein closely spaced points on the cam shape to be generated are each defined by specified measurements in two coordinates, comprising in combination a sensitive photographic element, a movable support for such element, a movable photographic illuminating unit, means for imparting component movements in one coordinate in equal small incremental steps to one of the two members constituted by the element support and the photographic unit relatively to the other of such members, and micrometer means for moving the other of the two members in discrete steps whereby in association with each of the component positions determined by such incremental stepped movements an accurately measured component movement in the other coordinate corresponding to the specified measurement appropriate to such component position for defining the cam shape is imparted to one of such two members relatively to the other, whereby such component movements combine to produce a resultant stepped relative movement between such two members in accordance with the cam shape to be generated, the photographic illuminating unit including a source of light, a small aperture, means whereby light from the source can be concentrated with the aid of the aperture on to a small area of the sensitive photographic element, and means normally shutting off such light but operable at will to permit the light to pass to the sensitive photographic element, whereby by operating such means in turn in each of the stepped relative positions determined by such resultant stepped relative movement and subsequently developing the sensitive photographic element a negative will be produced bearing on a translucent background a line of small dark patches, of shape corresponding to that of the aperture, constituting an optical representation of the cam shape defined by the specified coordinate measurements.

2. Apparatus as claimed in claim 1, in which a rectangular system of coordinates is used, the apparatus including guide means for constraining the photographic illuminating unit to move in the direction of one coordinate, and guide means for constraining the element support to move in the direction of the other coordinate.

3. Apparatus as claimed in claim 1, including mounting means for constraining the element support to move in accordance with one coordinate, and mounting means for constraining the photographic illuminating unit to move in accordance with the other coordinate, the photographic unit being detachably mounted on its mounting means.

4. Apparatus as claimed in claim 1, in which a polar system of coordinates is used, the equal stepped component movements being effected in the angular coordinate, while the accurately measured component movements are effected in the radial coordinate.

5. Apparatus as claimed in claim 4, including means for mounting the element support rotatably about the origin of coordinates, a micrometer constituting the means for imparting the accurately measured controlled movements, and radial guide means along which the photographic illuminating unit can slide under the control of the micrometer.

6. Apparatus as claimed in claim 1, in which the aperture in the photographic illuminating unit is circular in shape and bears a size relationship to the magnitude of the equal stepped movements in the first coordinate such that the round dots recorded on the negative overlap one another to form a continuous curved line thereon.

7. Apparatus as claimed in claim 1, in which the photographic illuminating unit comprises, in addition to the source of light and the small aperture, a closed casing for housing the unit, an optical condensing system for concentrating light from the source on to the aperture, an optical objective for focussing light from the aperture accurately on the photographic element and a movable shutter normally shutting off the light from the photographic element but operable at will to permit the light to pass to the element.

8. Apparatus as claimed in claim 1, including three stops on the element support and three accurately ground portions of the edge of the photographic element for cooperating with such stops, whereby the element after removal from the support for developing can be accurately re-positioned thereon when developed.

References Cited in the file of this patent

UNITED STATES PATENTS

| | | |
|---|---|---|
| 1,575,408 | Bassani | Mar. 2, 1926 |
| 2,398,904 | Libman et al. | Apr. 23, 1946 |
| 2,412,761 | Williams | Dec. 17, 1946 |
| 2,478,555 | Yule | Aug. 9, 1949 |
| 2,718,813 | Leininger | Sept. 27, 1955 |
| 2,733,510 | Darago | Feb. 7, 1956 |
| 2,758,504 | Tindale | Aug. 14, 1956 |
| 2,931,723 | Clark | Apr. 5, 1960 |